(12) United States Patent
Barrett et al.

(10) Patent No.: US 9,210,419 B2
(45) Date of Patent: Dec. 8, 2015

(54) SYSTEM AND METHOD FOR DIAGNOSTIC MODELING OF AUDIO AND VIDEO QUALITY OF SERVICE

(71) Applicant: NetScout Systems, Inc., San Jose, CA (US)

(72) Inventors: Paul Alexander Barrett, Westford, MA (US); Simon Richard Broom, Suffolk (GB); Marc Isambart, Suffolk (GB); Ludovic Malfait, Belmont, CA (US)

(73) Assignee: Netscout Systems, Inc., Westford, MA (US)

( * ) Notice: Subject to any disclaimer, the term of this patent is extended or adjusted under 35 U.S.C. 154(b) by 470 days.

(21) Appl. No.: 13/627,356

(22) Filed: Sep. 26, 2012

(65) Prior Publication Data

US 2013/0083203 A1 Apr. 4, 2013

Related U.S. Application Data

(60) Provisional application No. 61/541,798, filed on Sep. 30, 2011.

(51) Int. Cl.
*H04N 11/02* (2006.01)
*H04N 17/00* (2006.01)
*H04L 12/26* (2006.01)
*H04N 21/442* (2011.01)

(52) U.S. Cl.
CPC .......... *H04N 17/004* (2013.01); *H04L 43/0829* (2013.01); *H04N 21/44209* (2013.01)

(58) Field of Classification Search
USPC .......................................... 348/180
See application file for complete search history.

(56) References Cited

U.S. PATENT DOCUMENTS

| | | | |
|---|---|---|---|
| 6,434,606 B1* | 8/2002 | Borella et al. | 709/214 |
| 2003/0009718 A1* | 1/2003 | Wolfgang et al. | 714/751 |
| 2003/0145076 A1* | 7/2003 | Procopio et al. | 709/224 |
| 2010/0053335 A1* | 3/2010 | Hong et al. | 348/180 |
| 2010/0161779 A1* | 6/2010 | Vanderhoff et al. | 709/223 |
| 2012/0209952 A1* | 8/2012 | Lotfallah et al. | 709/217 |

OTHER PUBLICATIONS

Berends, J. et al., "Degradation Decomposition of the Perceived Quality of Speech Signals on the Basis of a Perceptual Modeling Approach," *JAES*, Dec. 2007, pp. 1059-1076, vol. 55, No. 12.

\* cited by examiner

*Primary Examiner* — Dave Czekaj
*Assistant Examiner* — Leron Beck
(74) *Attorney, Agent, or Firm* — Fenwick & West LLP

(57) ABSTRACT

Systems and methods are described for determining a set of three quality metrics for audio and/or video signals transmitted through a packet network. The set of three metrics provide more insight into which factors are affecting the quality of the received signal as perceived by the end-user. These three quality metrics measure reductions in quality due to lossy media transmission, packet loss concealment from packet loss and/or packet/frame jitter, and long periods of silence and/or frozen video. Because each metric quantifies a different aspect of transmitted quality, a deficiency in the transmitted signal can be identified by reference to the set.

22 Claims, 4 Drawing Sheets

| Service | Q0 | Q1 | Q2 |
|---|---|---|---|
| Real-time conversational services over UDP | Inherently degraded media quality due to: coding technology low bit-rate (video) [audio-bandwidth] [video resolution] | Effects of packet loss concealment due to: packet loss late packets discard due to jitter | n/a |
| Broadcast video/linear TV over UDP (short buffer) | as above | Effects of packet loss concealment due to: packet loss late packet discard due to jitter | Long mutes or video freezes due to: low throughput and subsequent buffer underflow |
| Video-on-demand over UDP (long buffer) | as above | Effects of packet loss concealment due to: packet loss | Long mutes or video freezes due to: low throughput and subsequent buffer underflow |
| Broadcast video/linear TV over TCP (short buffer) | as above | Short freezes due to: transient period of low-throughput | Long mutes or video freezes due to: low throughput and subsequent buffer underflow |
| Video-on-demand over TCP (long buffer) | as above | n/a | Long mutes or video freezes due to: low throughput and subsequent buffer underflow |

FIG. 4

SYSTEM AND METHOD FOR DIAGNOSTIC MODELING OF AUDIO AND VIDEO QUALITY OF SERVICE

CROSS REFERENCE TO RELATED APPLICATIONS

This application claims the benefit of U.S. Provisional Application No. 61/541,798, filed Sep. 30, 2011, which is incorporated by reference herein in its entirety.

BACKGROUND

The present disclosure relates to the field of objective quality measurement for packet based audio and video applications. Specifically, this disclosure describes embodiments of a system and method for diagnostic modeling of audio and video quality of service.

The quality of video or audio media can be measured either subjectively or objectively. Subjective measurements measure the perceptions and opinions of viewers or listeners. Objective measurements measure specific stream and/or transmission parameters. For subjective quality measurements, one person's impression of 'good' may be quite different to another person's impression, but neither is incorrect. Subjective quality measurement systems are therefore designed and tested against an "average" person's perception of audio or video quality and summarized by a Mean Opinion Score ("MOS").

Subjective testing aims to find the average user's perception of the media quality that is delivered by a system by asking a panel of users a directed question and providing them with a limited response choice. For example, to determine the listening quality of a voice signal, users are asked to rate "the quality of the speech" on a five-point scale from Bad to Excellent (in accordance with ITU-T Recommendation P.800). The MOS for a particular test condition is calculated by averaging the votes of all subjects for that particular condition. A subjective test will typically contain many different conditions. Therefore, such tests take a long time to perform and the results are influenced by a wide range of factors.

Objective testing techniques measure physical properties of a system. Objective perceptual algorithms map these physical properties to a predicted subjective score. In comparison to subjective testing, objective measurements are fast, inexpensive and repeatable. Significant work has lead to objective prediction techniques that provide an automated prediction of audio and video quality and replace the need for a large proportion of subjective testing. Objective quality measurement techniques can be further categorized as intrusive (active) or non-intrusive (passive). In general, active methods rely on a known test signal being passed through the system being analyzed; passive methods monitor live traffic.

SUMMARY

Embodiments are described that use a passive, objective quality model to monitor and quantify the quality of received video or audio transmissions sent through a packet network; however, the set of three diagnostic metrics disclosed herein can also be used to report measurements made using active measurement techniques. Embodiments of the present disclosure provide more insight into which factors are actually affecting the quality of a transmitted signal as perceived by an end-user by identifying three quality metrics for an audio and/or video transmission. These three metrics are provided to quantify the quality of a signal regardless of the nature of the transmitted signal, the type of data being transmitted, or the value of the quality metric. These three quality metrics measure, for example, reductions in quality due to lossy media transmission, packet loss concealment from packet loss and/or packet/frame jitter, and long periods of silence and/or frozen video. These factors have different effects on perceived quality, e.g., compression at a low bit-rate may reduce the inherent quality of an audio or video signal, whereas low-throughput can result in long freeze events.

BRIEF DESCRIPTION OF THE DRAWINGS

FIG. 4 is a summary of various features and applications of a set of diagnostic quality metrics, in an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments herein are described with reference to the figures where like reference numbers indicate identical or functionally similar elements. Most objective quality prediction models solutions only produce a single Mean Opinion Score ("MOS") value. The result is that the single MOS value provides the ability to detect quality problems, but does not provide any insight into the source of the problems. Of course, in many situations, a single quality score may be accompanied by lower level metrics, such as bit-rate, packet loss, etc. However, it is not always clear which factors are actually affecting the end-user's perception of quality and which are not. For example, ITU-T Recommendation G.1070, which is incorporated by reference herein in its entirety, describes how an audio MOS and a video MOS can be combined to provide an overall audio-visual MOS. However, the usefulness of such a combination is questionable because the violation of a threshold by the combined audio-visual MOS does not provide an indication of whether the audio signal quality or the video signal quality was at fault; whereas this information is already provided in the separate audio and video MOS values.

Embodiments of the present disclosure provide more insight into which factors are actually affecting the quality of a transmitted signal as perceived by an end-user by identifying three quality metrics for an audio and/or video transmission. These three metrics are provided to quantify the quality of a signal regardless of the nature of the transmitted signal, the type of data being transmitted, or the value of the quality metric. These three quality metrics measure reductions in quality due to lossy media transmission (referred to herein as "Q0"), packet loss concealment from packet loss and/or packet/frame jitter (referred to herein as "Q1"), and long periods of silence and/or frozen video (referred to herein at "Q2"). These factors have different effects on perceived quality, e.g., compression at a low bit-rate may reduce the inherent quality of an audio or video signal, whereas low-throughput can result in long freeze events. One benefit of this model is that it provides more insight into which factors are actually affecting the quality perceived by the end-user.

Measuring Quality Metrics of Received Audio and/or Video Frames

Figure 1:
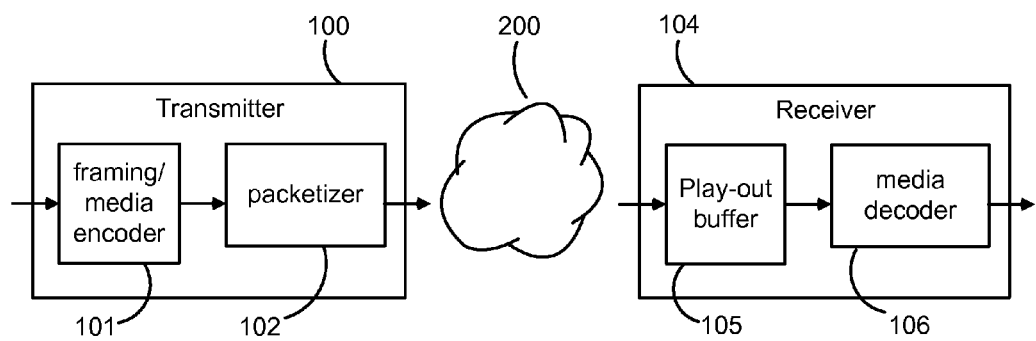
FIG. 1 is a system block diagram for transmitting information through a packet network, in an embodiment.

FIG. 1 shows a typical system that transmits media information over a packet network. The system includes a transmitter 100, a packet network 200, and a receiver 104.

The transmitter 100, which includes a framer/media encoder 101 and a packetizer 102, receives input audio and/or video signals and divides the input signals into frames. The frames can be encoded using the framer/media encoder 101 and packetized using the packetizer 102 according to any data transfer protocol. For example, in computer networking systems, the frames can encoded and packetized as Ethernet frames or point to point protocol (PPP) frames. In telecommunication networks, frames can be encoded using time division multiplex (TDM) or time-division multiple access (TDMA) protocols. Other framing/encoding protocols may be used to frame/encode and packetize packets without departing from the described embodiments.

The frames encoded by the framer/media encoder 101 and packetized by the packetizer 102 are then transmitted through the packet network 200. Examples of the transmitter 100 include, but are not limited to, systems such as gateway servers used by telecommunications network operators and/or content providers, radio frequency transmitters (e.g., mobile telecommunications transceivers), Internet web servers, and others.

The packet network 200 includes any packet-based network. Examples of packet networks include the Internet, mobile communications networks (e.g., 3G and 4G networks), WLAN, LAN, and others. Packets are generally transported through the network 200 using either a best-effort delivery mechanism, such as the UDP/IP protocol, or a guaranteed delivery mechanism, such as the TCP/IP protocol. Packets lost during transmission across the packet network are not re-transmitted in a best-effort scheme, whereas they are re-transmitted in a guaranteed delivery scheme.

The packets are received at the receiver 104, examples of which include servers, computing devices, video receivers, and telephones (mobile or stationary). The receiver 104 places the received packets into a play-out buffer 105. The play-out buffer (sometimes called a jitter or sequence buffer) allows out-of-order packets to be re-sequenced and allows time for late packets to arrive. Frames are extracted/reconstructed from the packets as they leave the play-out buffer and are passed to the media decoder 106, which converts the frames into the audio or video signal that is finally presented to the end-user. The media decoder 106 can be any kind of decoder or codec used to code and/or decode transmitted signals.

As received by the media decoder 106, audio frames typically represent a few tens of milliseconds of audio signal, such that audio packets usually contain one or more audio frames, depending on how much delay can be tolerated. Video frames typically represent a whole image or a slice of an image. Higher resolution video frames are typically transmitted in multiple packets due to their large data size.

These transmission mechanisms, compression algorithms, and others schemes not mentioned, can introduce quality problems. Embodiments of the present disclosure can then quantify the quality problems using a set of quality metrics, {Q0, Q1, Q2}, as described in more detail below. In particular, the capture and evaluation of the received packets/frames, and the calculation of the set of quality metrics {Q0, Q1, Q3} is described in the context of FIG. 2.

Sources of Packet Quality Defects

Packet quality defects can be caused by various aspects of transmission, re-transmission, compression algorithm application, and signal buffering. For example, the re-transmission of packets can introduce significant transmission delays. Conversational services, such as voice over IP (VoIP) and videoconferencing, usually employ a best-effort transmission protocol such as UDP to minimize any transmission delay. However, delay is less important in unidirectional services, such as video or audio streaming, and such services may use either a best-effort or a guaranteed delivery mechanism depending on the design of the system.

Most audio and video transmission systems use a lossy compression algorithm to reduce the bit-rate of the media signal before it is transmitted. Lossy compression techniques achieve higher compression ratios than lossless mechanisms, but at the expense of introducing distortion to the signal during the encoding and decoding process. Designers of lossy compression algorithms aim to make any distortion in the decoded signal as imperceptible as possible. ITU-T G.729 and ITU-T H.264 are examples of lossy audio and video compression algorithms respectively.

Many audio and video coding algorithms are capable of operating at different bit-rates to allow a trade-off between transmission rate and quality. The amount of distortion that is audible or visible can also vary greatly from algorithm to algorithm and can even vary as a function of the media content, for example the amount of movement in a video sequence. Other methods of reducing the data-rate of the signal include reducing the bandwidth of an audio signal and reducing the resolution and/or frame-rate of a video signal, all of which similarly pose trade-offs between transmission rate and quality.

An aspect of many video compression algorithms is the use of different frame types. Intra-coded frames (I-frames) are self-contained and can be decoded in isolation to produce a whole image or image slice. Predictive frames (P-frames) only contain changes relative to an earlier frame. Bi-directional predictive frames (B-frames) contain changes relative to both preceding and subsequent frames. This can be a factor when determining the effect of a missing or damaged frame. Many audio algorithms also use a degree of predictive coding. Depending on which frame type is used, a quality problem in a first frame can cause additional quality problems in proximate frames using the first frame for decoding.

Quality of a received packet can, in some cases, be affected by the buffering scheme used to temporarily store packets/frames. Conversational applications aim to maintain a low, relatively constant delay and consequently use small play-out buffers. This means that some frames may be discarded or only partially decoded if the constituent packets arrive too late to be used. Compression algorithms that are intended for use in conversational services are designed to be resilient to missing or corrupted frames. The technique of hiding the effects of lost or late packets is called packet loss concealment (PLC). PLC algorithms are generally good at disguising the effects of a few missing packets; however, large bursts of missing packets may result in short periods of muted audio or frozen video.

Unidirectional streaming applications generally use a large play-out buffer. In such systems the media signal is typically only played out from the buffer once the buffer has filled to a pre-determined threshold, e.g. when the buffer is half-full. Frames are only played out once all of the constituent packets have been received. If frames are played-out faster than they arrive, the play-out buffer will under-run. A typical system will then mute the audio and/or freeze the video until the buffer has been re-filled to the same or a new pre-determined threshold. In video-on-demand type applications, playback will continue from where it paused; however in broadcast applications, some of the program content may be skipped so that the user does not fall too far behind the live program material. The periods of muted audio or frozen video resulting from re-buffering events tend to be significantly longer than those arising from high levels of packet loss or packet jitter in a best-effort transport system.

Variations between the expected arrival time of packets and their actual arrival time is commonly called packet jitter. In applications such as video where frames may be spread over multiple packets, another factor is frame jitter, which is essentially the variation in arrival time of the last packet of a frame, which determines when the frame can actually be played out. This can be relevant in applications where the network throughput is only slightly higher than the video bit-rate and in which some frames require more data to be sent than others, for example I-frames.

Packet Quality Metrics

Recently, a number of studies, for example "Degradation Decomposition of the Perceived Quality of Speech Signals on the Basis of a Perceptual Modeling Approach", Berends, John G.; Busz, Bartosz; Oudshoorn, Paul; Van Vugt, Jeroen; Ahmed, Kamal; Niamut, Omar, JAES Volume 55 Issue 12 pp. 1059-1076; December 2007, have been published that attempt to produce a so-called "multi-dimensional degradation decomposition," which describes a set of diagnostic values intended to give insight into the source of quality impairments. As mentioned above, these have broadly fallen into two categories: subjective and objective. Subjective multi-dimensional values are those with dimensions that reflect different aspects of human perception, such as whether a signal is "muffled," "bright," "choppy," for example. Objective multi-dimensional values are those with dimensions that indicate signal perturbations closer to the cause of the impairment, such as whether the signal contains additive noise, frequency modification, muting, for example. However, such decompositions focus on classifying the distortions in the decoded signal, whereas the present invention classifies distortion according to the cause of the distortion, specifically in relation to aspects of a packet transport system.

Most objective quality models are limited to specific application areas. For example, the multi-dimensional impairment ("MDI") metric described in IETF RFC 4445 attempts to provide insight into video streaming quality by predicting the length of a play-out buffer used to compensate for transmission conditions; however, it is limited to video streaming applications only. The ITU-T P.564 metric predicts a MOS value that includes the effect of voice coding, packet loss and jitter, but is limited to conversational voice services.

Diagnostic Quality Metrics for Packet Quality of Service

Embodiments described herein include a passive objective quality model that is a set of metrics having three output metrics, {Q0, Q1, Q2}, where each output corresponds to degradations caused by a particular class of transmission problems commonly found in audio and/or video packet transmission applications. One benefit of this model is the generation of a degradation decomposition set that provides insight into the source of quality problems in packet based audio and video transmission. Hence, not only can quality problems be detected, but the underlying cause of the problem can also be diagnosed.

Another benefit of this model is that the same three outputs can be used to characterize a wide range of media transmission applications, including audio and video, voice, real-time conversational services, broadcast streaming services (and other uni-directional services), video-on-demand services, as well as best-effort packet delivery services such as UDP/IP, and guaranteed delivery services, such as TCP/IP.

As mentioned above, embodiments include a set of three diagnostic quality metrics that relate to different underlying causes of impairment found in the packet-based transmission of audio and visual signals. The set, which is provided in its entirety upon diagnosis even if one or more of the values is a null (or zero) value, is: {Q0, Q1, Q2}.

Q0 reflects reductions in quality due to lossy media transmission. For example, Q0 can quantify signal quality degradation due to compression technology, reduced bit-rate and/or frame rate, and reduced audio-bandwidth or video resolution. Q1 reflects reductions in quality due to packet loss concealment arising from packet loss and packet/frame jitter. This type of degradation can include short periods of silence or frozen video. Q2 reflects long periods of silence or frozen video, which can be caused by, for example, playout buffer underflow followed by re-buffering. These events may be followed by skipping or continued replay depending on the application.

In systems that transmit both audio and video information, the set of the three quality metrics will be produced for the audio stream and a separate set of the three quality metrics produced for the video streams. Some applications may require one or two of the three metrics, or other applications may result in a null value for one or more of the metrics—regardless, the entire set of values is produced. This unified set of metrics can be used across many applications.

Each quality metric may be reported either as an absolute quality value, (e.g., MOS) or as degradation value (e.g., a reduction in MOS). The Q2 value can also be reported as a set of statistics, for example the distribution of freeze event duration or even just the number of and mean duration of events.

In general, Q0 relates to problems with the configuration of the audio or video application, e.g., if the data rate of the compression algorithm has been set too low. Q1 relates to packet loss and jitter. Q2 relates to throughput problems. Hence, the set of quality metrics collectively indicates the overall quality of the signal being assessed, and also provides information about the source of any problems. The corollary is that in situations where multiple underlying problems exist, it is possible to see which are having the most impact on end-user satisfaction, and remedial action can be prioritized accordingly. The separation of Q0 factors from Q1 and Q2 factors is particularly useful in an operational environment because the group responsible for maintaining the media application is often different from the group responsible for maintaining the packet network.

In many applications, Q0 will be normalized for a particular audio bandwidth or video resolution. However, Q0 can optionally be extended to include the effects of reduced audio bandwidth or video resolution. For example many VoIP systems now operate with an audio bandwidth of 7 kHz for internal calls, but with a bandwidth of 4 kHz when connected to the public switched telephone network (PSTN). In this situation it is logical to include the effects of a drop in audio bandwidth in Q0. By contrast, if a videoconferencing application can only operate at video resolutions of 352×288 pixels (CIF) or smaller, there is little point in reporting video quality scores relative to 1920×1080 high-definition resolution.

If measurements are made at multiple points in the transmission path, Q1 can be used to help identify the location of transmission impairments that affect the quality of the received media signal. Layered or scalable coding schemes allow network elements to discard some of the encoded media information, thus reducing the bit-rate. The generation of Q0 in multiple locations will help to identify the location of such mid-network bit-rate reductions.

Measuring Packet Quality And Determining the Set of Diagnostic Quality Metrics

Figure 2:
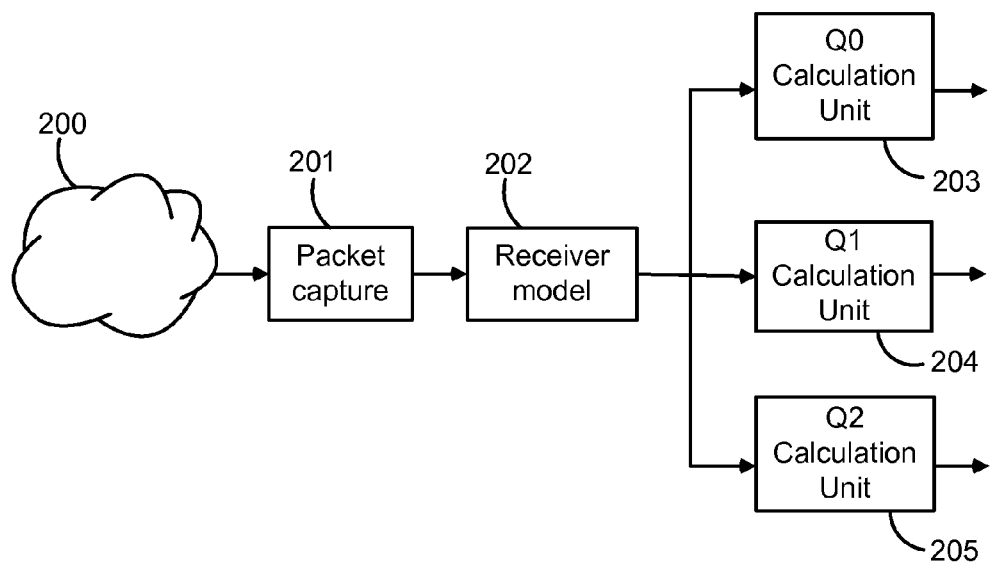
FIG. 2 is a system block diagram for analyzing packets transmitted through a packet network to produce a set of diagnostic quality metrics, in an embodiment.

FIG. 2 shows an embodiment of a system used capture and evaluate packets/frames, and calculate the set of diagnostic quality metrics {Q0, Q1, Q2}. Packets transmitted through the network 200 are monitored or captured (or copied and captured) by a packet capture device 401, thereby monitoring live network traffic, consistent with passive monitoring techniques. Examples of the packet capture device 201 include network taps, packet sniffers, filterable network access points, and others. In one embodiment, an NGENIUS 1500 system produced by NETSCOUT SYSTEMS, Inc. of Westford, Mass. can be used to capture and evaluate packets/frames.

Captured packets are passed to the receiver model 202. The receiver model uses assumptions about the processes that take place in an actual receiver 104 in order to produce intermediate metrics that can be used to calculate Q0, Q1 and Q2. For example, for an RTP video stream the receiver model will determine:

the bit-rate and frame-rate of the stream, which can be calculated from sequence number and timestamp information in the RTP header and the size of the RTP payload (used to calculate Q0);

the proportion of frames classified as bad and damaged, which can be determined from sequence number and timestamp information in the RTP header (used to calculate Q1); and an estimate of the number and duration of freeze events, which can be determined from the capture time of the packets and an assumption about the size of the buffer in the receiver 104 and the buffer play-out strategy (used to calculate Q2).

The receiver model 202 is also responsible for separating multiple streams that have been multiplexed together. Separating multiple streams then permits the receiver model 202 to classify the packets of each stream independently from the other streams so that a set of quality metrics can be calculated independently for each stream.

The receiver model 202 produces, as appropriate, the following information for each frame received:

1. the time at which the frame should be played out (this may be relative to an earlier frame);
2. the time at which all packets relating to the frame were deemed to be received (note that in a best-effort transport system some packets may be lost in the network, or in a conversational system some packets may be discarded because they arrived too late to be used);
3. an indication of whether the frame is a good frame (i.e., a frame that can be fully decoded); a damaged frame (a frame that can be partially decoded); or a bad frame (a frame that is too corrupted to be used or is missing altogether);
4. the duration of the frame;
5. the amount of data in the frame.

The classification of a frame as good, damaged or bad will depend on the application; it may also depend on the status of the frames around it. For example in a video application, if an I-frame is damaged, which does not utilize proximate frames for decoding, then all subsequent P and B frames, which do use proximate frames for decoding (such as the damaged I-frame), may be marked as bad until the next good I-frame is received. Similarly, the determination of which frames are classified as late in a conversational application will depend on the size of the play-out buffer. For example, if the buffer is only large enough to contain a certain number of packets, packets arriving properly but unable to be stored in the buffer may be identified as late. If the exact behavior of the receiver is unknown at the monitoring point, it can be estimated or based on assumptions. Common media transport protocols include RTP and MPEG2-TS. Such protocols contain timestamps and sequence numbers that when combined with the packet capture time can be used to derive the set of information above. These steps are well known in the art as they are steps receivers must perform as part of the playout process.

The output of the receiver model 202 is passed to each of the metric calculations units, Q0 (203), Q1 (204) and Q2 (205). In this embodiment, Q0 and Q1 are both MOS predictions, although quality calculation schemes other than MOS may be used.

Figure 3:
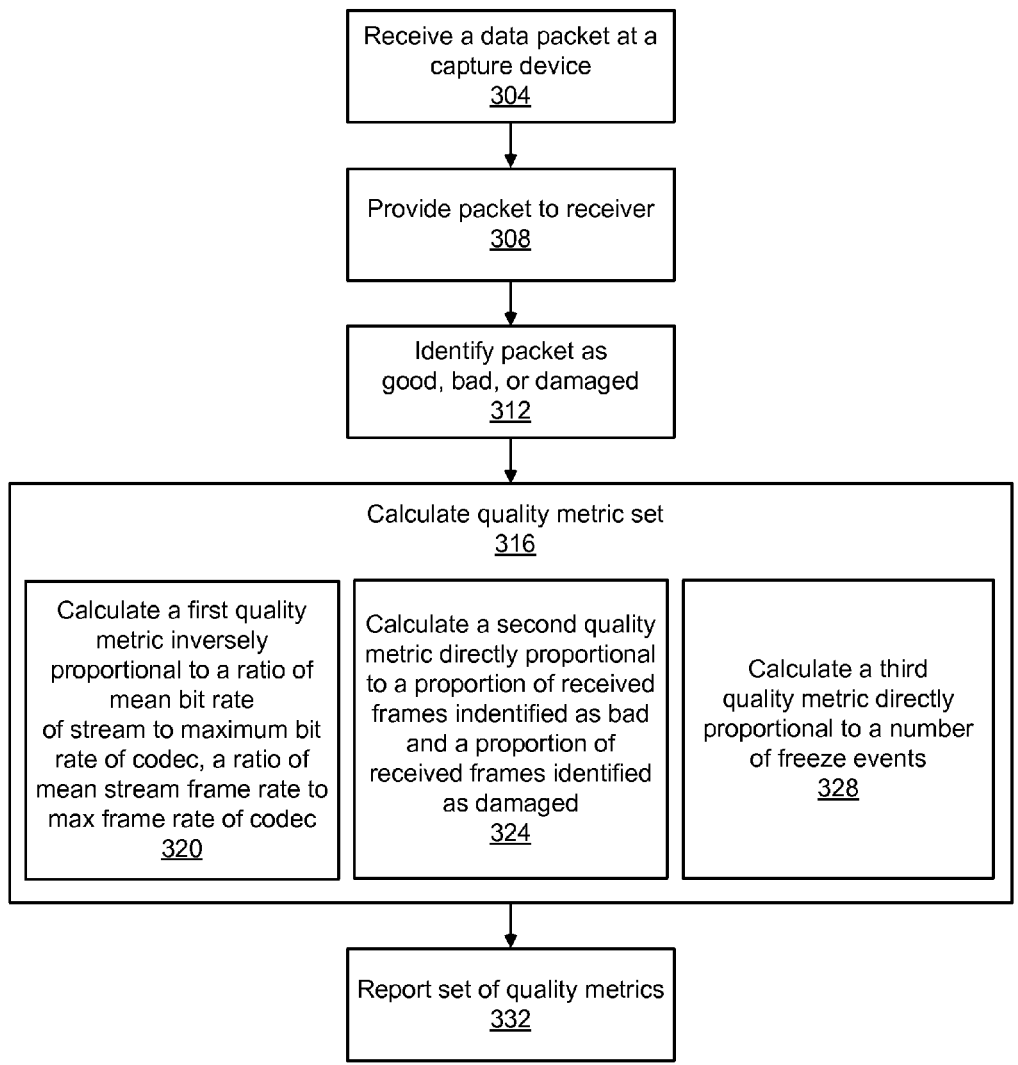
FIG. 3 is a method flow diagram illustrating a process for determining a set of diagnostic quality metrics, in an embodiment.

FIG. 3 illustrates a high-level method flow diagram illustrating a method 300 that is performed by the above-described system. In the method 300, a packet or frame is received 304 by the system (for example, using a network tap or packet sniffer as described above). The packet/frame is provided 308 to the receiver model 202, which then identifies 312 the packet/frame as good, bad, or damaged. This identification is then used in the calculation 316 of the quality metric set, as described below.

In one embodiment, the calculation of Q0 320, performed as part of the meta-process 316, for an entire media stream or part thereof is calculated as the following weighted sum:

$$Q0=((A0-(A1*(1/M1)+A2*(1/M2))-1)*M3)+1$$

For a video stream: weight a0 is a fixed value that represents the highest MOS that a video codec (one embodiment of media decoder 106 in FIG. 1) can achieve at its maximum bit-rate and frame-rate. Variable m1 is the ratio of the mean bit-rate of the video stream to the maximum bit-rate of the codec; weight a1 reflects how the quality of the codec falls with reducing bit-rate. Variable m2 is the ratio of the mean video frame-rate to the maximum frame-rate of the codec; weight a2 reflects how the quality of the codec falls with reducing frame-rate. Variable m3 is a correction factor that reflects the effects of a lower resolution being used than the one used to calculate a0; m3 is taken from a look-up table with an entry for each expected resolution. Weight a0 can be adjusted to optimize the prediction for a particular type of content, e.g. head and shoulders images in video conferencing.

For an audio stream: weight a0 is a fixed value that represents the highest MOS that the audio codec (another embodiment of media decoder 106 in FIG. 1) can achieve at its maximum bit-rate. Variable m1 is the ratio of the mean bit-rate of the audio stream to the maximum bit-rate of the codec; weight a1 reflects how the quality of the codec falls with reducing bit-rate. Variable m3 is a correction factor that reflects the effects of a lower audio bandwidth being used than the one used to calculate a0; m3 is taken from a look-up table. Variable m2 and weight a2 are not used for an audio stream.

The calculation of Q1 324, as performed within meta-process 316, for an entire media stream or part thereof is calculated as the following weighted sum:

$$Q1=A0-(A11*M11+A12*M12)$$

For both audio and video streams: weight a0 is the same fixed value used in the calculation of Q0. Variable m11 represents the proportion of frames that were classified as bad; weight a11 represents the impact of bad frames on quality.

Variable m12 represents a proportion of frames that were classified as damaged; weight a12 represents the impact of damaged frames on quality.

The calculation of Q2 328, as performed within meta-process 316, is based on a buffer underflow detection module, which maintains a model of a playback buffer. The first frames from a media stream are added to the buffer model until the model meets its playback threshold. Once the threshold has been achieved, playback is deemed to have started at a time equal to the receive time of the frame that caused the threshold to be exceeded.

Subsequent frames are checked to determine if they were received in time to honor their playback time relative to the start of the current playback period. If a frame has arrived too late to be played out, then the buffer counters are reset and a flag is set to indicate that the playout buffer has under-flowed. The start of the associated freeze event is deemed to be the playout time of the previous frame. Once the buffer has passed its playback threshold, the end of the freeze event is deemed to be the wall-clock time that the first frame in the buffer was played. If the buffer is re-filling when the end of stream notification is received, the final freeze period is deemed to have finished at the time that the notification was received.

In a first embodiment, Q2 may simply represent the number of freeze events and their average duration for an entire media stream or part thereof.

In a second embodiment, Q2 may represent a distribution of freeze events as a function of their duration.

In a third embodiment, Q2 may be mapped to a MOS value by determining the following weighted sum:

$$Q2 = A0 - (B1*N1 + B2*N2 \ldots BN*NN)$$

Where Ni is the number of freeze events with a duration between Ti,lower and Ti,upper and b1 is a weight that represents the perceptual effect of different duration freezes. Weight a0 is the same fixed value used in the calculation of Q0.

Note that Q2 does not apply for real-time conversational services over UDP because such services do not use large play-out buffers. Hence, if Q2 represents freeze statistics, these can be set to represent zero freeze events, or if Q2 is a MOS value, it can be set to equal a0 for the codec being used.

In an embodiment, MOS values are reported on the 1 to 5 scale. Any calculations resulting in a MOS value below 1 are reported as 1.

Q0, Q1 and Q2 (when expressed as a MOS) can all be mapped to a MOS degradation by deducting the MOS value from the a0 weighting value for the codec being used.

Q1 and Q2 can optionally be replaced by a0*m3 or by Q0 in the calculation of Q1 and Q2. In the latter case, this means that Q1 and Q2 will not exceed Q0 when all three metrics are expressed as MOS values, i.e., Q1 and Q2 are relative to Q0, rather than absolute values.

The equations and calculations set forth above for Q0, Q1 and Q2 are provided as examples. The present application is intended to include alternative calculations that include one or more following basic inputs:

Q0 (audio)—audio quality with no transmission errors, bit-rate, audio bandwidth

Q0 (video)—video quality with no transmission errors, bit-rate, frame-rate, resolution Q1—packet loss, missing frames, frames with missing data, packet jitter, frame jitter Q2—playout buffer underflow events, frame jitter Regardless of the equation or calculation used to calculate 316 the set of metrics, the set is reported 332 once the calculation is completed. Reporting 332 the set of metrics then enables the identification of quality problems as well as the source of quality problems.

Various features and applications of the three quality metrics are summarized in FIG. 4.

For the purpose of this application, play-out buffers include buffers that store packets and buffers that store frames extracted from the media transport protocol.

It should be evident that a weighted combination of the three quality metrics can be used as the basis for an overall quality metric.

An example value of a0 for reporting the metrics as a MOS in the context of 4 kHz narrowband audio bandwidth would be 4.2 for G.711 and 3.9 for G.729. For G.711, a11 might have a value of 13.5, i.e., so the MOS would be 1.5 at a frame loss rate of 20%, and m3 might have a value of 0.9 for 4 kHz narrowband audio in a 7 kHz wideband context, giving a MOS of 3.78 for G.711 in a wideband context.

For H.264 encoded video at a CIF resolution, example values might be 4.5 for a0, 0.12 for a1 where m1 is calculated relative to 512 kbit/sec, 0.17 for a2 where m2 is calculated relative to 25 frame per second, and 1.67 for a11 (if we consider degradation to carry until next I frame). Setting a12 to the same value as a11 would indicate a decoder that can't process partially received frames. It will be apparent that these values represent an example and other values, scales, units etc. can be used without departing from the scope of the embodiments described herein.

SUMMARY

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the present invention is not described with reference to any particular programming language. It will be appreciated that a variety of programming languages may be used to implement the teachings of the present invention as described herein, and any references herein to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention.

What is claimed is:

1. A method for determining an objective quality model for quantifying quality of a received signal, the method comprising:
    receiving at least one of a transmitted audio signal or a transmitted video signal;
    determining a set of diagnostic quality metrics quantifying quality aspects of the received signal, comprising:
        determining a first diagnostic quality metric for measuring a reduction in signal quality due to lossy media transmission;
        determining a second diagnostic quality metric for measuring a reduction in signal quality due to packet loss concealment;
        determining a third diagnostic quality metric for measuring a reduction in signal quality due to playout buffer underflow; and
        wherein the first metric, the second metric, and the third metric are all different and are all provided in the set.

2. The method of claim 1, further comprising:
    responsive to receiving both an audio signal and a video signal:
        separating the received audio signal from the received video signal;
        determining a first set of diagnostic quality metrics for the received audio signal; and
        determining a second set of diagnostic quality metrics for the received video signal.

3. The method of claim 1, wherein the first diagnostic quality metric is inversely proportional to a first ratio of a mean bit-rate of the received signal divided by a maximum bit-rate of a codec decoding the received signal, and is inversely proportional to a second ratio of a mean frame rate of the received signal divided by a maximum frame rate of the codec decoding the received signal.

4. The method of claim 1, wherein the first quality metric is normalized for a bandwidth of the received signal.

5. The method of claim 1, wherein the second diagnostic quality metric is directly proportional to a proportion of frames classified as bad and a proportion of frames classified as damaged.

6. The method of claim 1, wherein the third diagnostic quality metric is directly proportional to a sum of a number of freeze events.

7. The method of claim 6, wherein each freeze event of the sum is weighted by a factor proportional to a duration corresponding to each freeze event.

8. The method of claim 1, wherein the third diagnostic quality metric is directly proportional to a distribution of freeze event duration.

9. The method of claim 1, wherein at least one diagnostic quality metric of the set is a null value.

10. The method of claim 1, wherein the transmitted audio signal, the transmitted video signal, or both, are transmitted using a conversational transmission application.

11. The method of claim 1, wherein the transmitted audio signal, the transmitted video signal, or both, are transmitted using a streaming application.

12. A system for determining an objective quality model for quantifying quality of a received signal, the system comprising:
    a packet capture device configured to receive network packets transmitted as a media stream through a packet network;
    a receiver model configured to identify the media stream and classify the network packets of the stream as good, bad, or damaged;
    a quality determination unit configured for execution of computer program code for determining a set of diagnostic quality metrics, comprising:
        determining a first diagnostic quality metric for measuring a reduction in signal quality due to lossy media transmission;

determining a second diagnostic quality metric for measuring a reduction in signal quality due to packet loss concealment;

determining a third diagnostic quality metric for measuring a reduction in signal quality due to playout buffer underflow; and wherein the first metric, the second metric, and the third metric are all different and are all provided in the set.

13. The method of claim 12, further comprising:
responsive to receiving both an audio signal and a video signal:
separating the received audio signal from the received video signal;
determining a first set of diagnostic quality metrics for the received audio signal; and
determining a second set of diagnostic quality metrics for the received video signal.

14. The method of claim 12, wherein the first diagnostic quality metric is inversely proportional to a first ratio of a mean bit-rate of the received signal divided by a maximum bit-rate of a codec decoding the received signal, and is inversely proportional to a second ratio of a mean frame rate of the received signal divided by a maximum frame rate of the codec decoding the received signal.

15. The method of claim 12, wherein the first quality metric is normalized for a bandwidth of the received signal.

16. The method of claim 12, wherein the second diagnostic quality metric is directly proportional to a proportion of frames classified as bad and a proportion of frames classified as damaged.

17. The method of claim 12, wherein the third diagnostic quality metric is directly proportional to a sum of a number of freeze events.

18. The method of claim 17, wherein each freeze event of the sum is weighted by a factor proportional to a duration corresponding to each freeze event.

19. The method of claim 12, wherein the third diagnostic quality metric is directly proportional to a distribution of freeze event duration.

20. The method of claim 12, wherein at least one diagnostic quality metric of the set is a null value.

21. The method of claim 12, wherein at least one of a transmitted audio signal or a transmitted video signal are transmitted using a conversational transmission application.

22. The method of claim 12, wherein at least one of a transmitted audio signal or a transmitted video signal are transmitted using a streaming application.

* * * * *